No. 660,934. Patented Oct. 30, 1900.
S. G. SPARROW.
PLANTER.
(Application filed May 5, 1900.)
(No Model.) 2 Sheets—Sheet 1.

WITNESSES:
H. Walker

INVENTOR
Stephen G. Sparrow.
BY
ATTORNEYS

No. 660,934. Patented Oct. 30, 1900.
S. G. SPARROW.
PLANTER.
(Application filed May 5, 1900.)
(No Model.) 2 Sheets—Sheet 2.
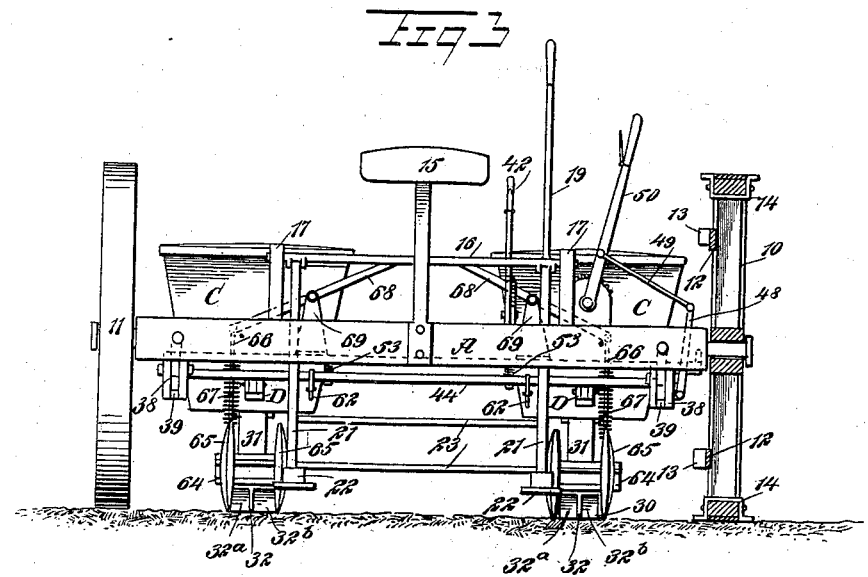
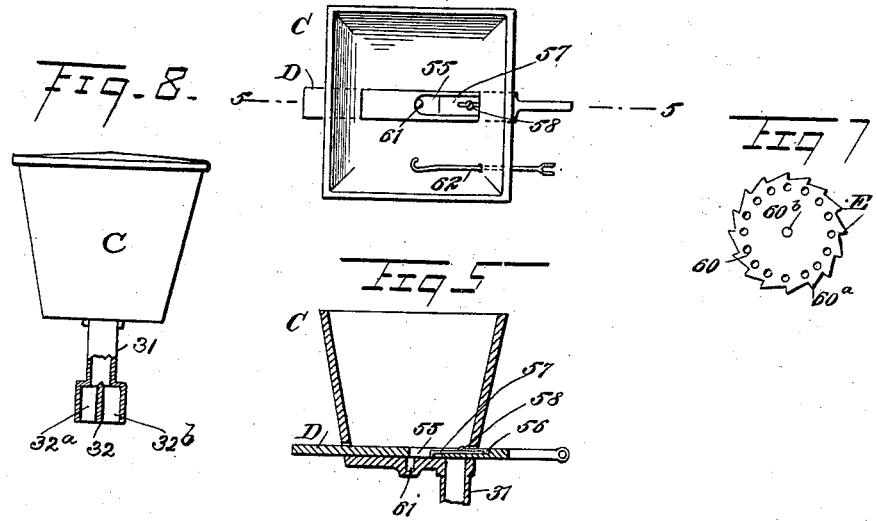
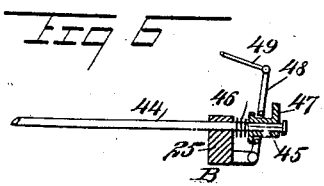
WITNESSES:
INVENTOR
Stephen G. Sparrow.
BY
ATTORNEYS

UNITED STATES PATENT OFFICE.

STEPHEN GREEN SPARROW, OF EMINENCE, KENTUCKY, ASSIGNOR OF TWO-THIRDS TO CHARLES O. LECOMPTE, RICHARD N. SMITH, AND SALLIE SLAUGHTER, OF SAME PLACE.

PLANTER.

SPECIFICATION forming part of Letters Patent No. 660,934, dated October 30, 1900.

Application filed May 5, 1900. Serial No. 15,616. (No model.)

*To all whom it may concern:*

Be it known that I, STEPHEN GREEN SPARROW, a citizen of the United States, and a resident of Eminence, in the county of Henry and State of Kentucky, have invented a new and Improved Planter, of which the following is a full, clear, and exact description.

One purpose of this invention is to so construct a planter for corn and other seed that the trip mechanism of the seedboxes will be operated whenever desired from one of the ground-wheels of the machine.

Another purpose of the invention is to provide checks upon one of the ground-wheels, so placed that checking may be accomplished both ways, dispensing with the check-rowing wire and the so-called "automatic stake-setter," and means whereby the wheel carrying the checks may be elevated and revolved to register with a row when necessary, and also to provide effective devices under the control of the driver for closing the furrow and covering the seed, together with means for separating the seed at the time the seed is delivered to the furrow, thus preventing the seed being planted in a mass.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
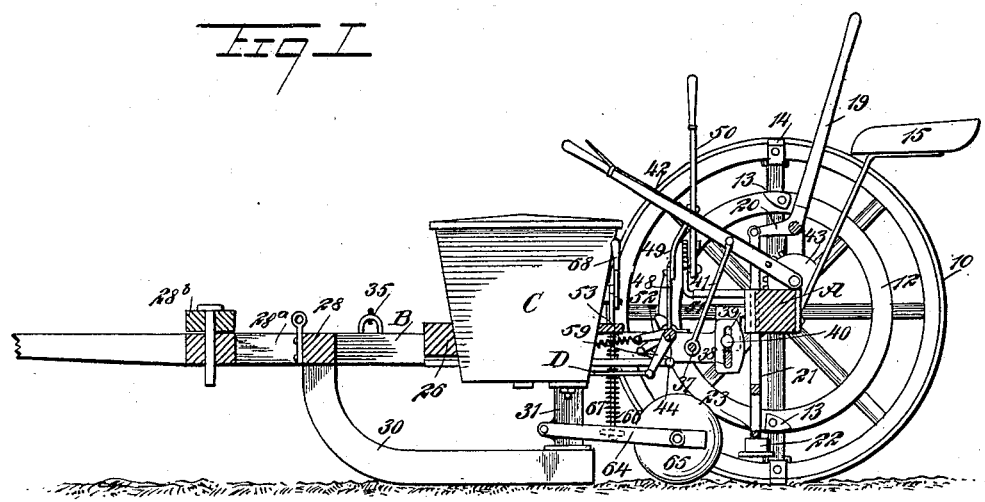
Figure 2:
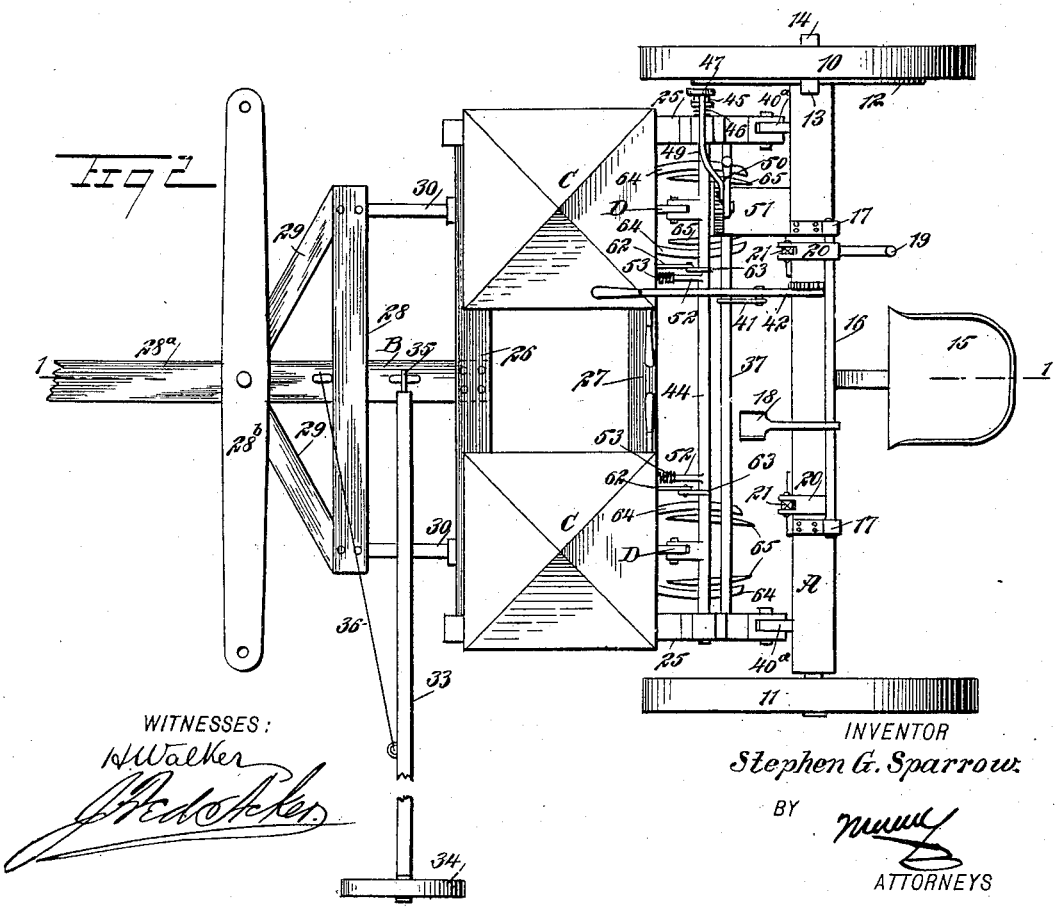

Figure 1 is a vertical section taken practically on the line 1 1 of Fig. 2. Fig. 2 is a plan view of the improved machine. Fig. 3 is a rear elevation of the machine, the wheel carrying the check devices being in vertical section. Fig. 4 is a plan view of one of the seedboxes. Fig. 5 is a vertical section through one of the seedboxes, the section being taken practically on the line 5 5 of Fig. 4. Fig. 6 is a detail sectional view of a portion of the main frame, illustrating also in section and in detail the mechanism for operating the seed-drop slide from one of the supporting-wheels. Fig. 7 is a plan view of a rotary seed-dropper which may be substituted for the reciprocating dropper shown in Figs. 4 and 5; and Fig. 8 is a rear elevation of a seedbox and spout, the lower portion of the spout appearing in section.

A represents the axle of the machine, upon which two ground-wheels 10 and 11 are mounted to turn. The right-hand ground-wheel 10 is provided with a rim 12, secured to the inner faces of its spokes, and this rim 12 carries two or more cams 13, usually placed diametrically opposite, or two or more offsets of a wedge or similar form, and the right-hand wheel 10 also carries two or more check devices 14, which are usually of U form, as represented, and are secured to the rim of the wheel, extending up to the tire, as shown best in Fig. 3, and these check devices are located opposite the cams or offsets 13, carried by the same wheel, as shown in Fig. 1. It will be understood that the cams or offsets 13 and the check devices 14 may be placed at any necessary distance apart for effective drilling or sowing seed of any kind.

The driver's seat 15 is secured to the axle A in any suitable manner, and in front of the driver's seat a shaft 16 is mounted in bearings 17, carried by the axle, and said shaft 16 is provided with a foot-lever 18, readily operated by the driver and likewise with a hand-lever 19, the hand-lever being attached either directly to the shaft 16 or to one of two arms 20, which extend forward from the said shaft, usually at points near its ends. These arms 20 are pivotally attached to or pivotally receive uprights 21, which are mounted to slide in guides carried by the forward portion of the axle A, and each upright 21 is provided at its bottom with a pivotally-attached shoe 22, adapted for engagement with the ground. The uprights 21 are usually connected by means of brace-bars 23, so that they will act in unison.

When it is desired to shift the right-hand or check wheel of the machine, either lever 18 or 19 is pressed downward or both levers may be so pressed, thus bringing the shoes 22 in engagement with the ground and elevating the axle a sufficient distance to permit the right-hand wheel 10 to be conveniently rotated; but a single lever may be used for this purpose. A frame B is supported from the axle A, and said frame B extends forward and carries the seedboxes C, which latter may be of any approved construction. As illustrated, the frame B comprises side bars 25, connected by front and intermediate bars 26 and 27, a pole or tongue 28ª being attached to the front bar 26 of said frame. A cross-bar 28 is attached to this pole or tongue, extending beyond opposite sides thereof, and is suitably braced by forwardly-extending converging braces 29, as shown in Fig. 2. Runners or furrow-openers 30 are attached at their forward upper ends to the bar 28, while the rear portions of the runners are connected with chutes 31, which chutes are adapted to receive the seed from the drop-slides and are consequently connected with the bottom portion of the seedboxes C, as illustrated particularly in Fig. 5.

It is preferable that the seed shall be separated at the time the seed is delivered in the furrow, and to that end the heel of each runner 30, which heel portions of the runners are conductors for the seed, is divided into two compartments 32ª and 32ᵇ by a central partition 32, and under such a construction it is obvious that the seed will not be planted in a mass.

The marking-arm 33 is of the usual construction and is provided with a marking-head 34 at its outer end, the inner end of said marking-arm 33 being pivoted at 35 in any approved manner to the pole 28ª, so that the said marking-arm may be readily carried over from the left-hand to the right-hand side of the machine, or vice versa, as required. The marking-arm 33 is usually manipulated through the medium of a cord, rope, or chain 36, attached to the arm and to the tongue or pole; but it will be understood that the marking-arm 33 may be manipulated from the driver's seat, if desired, in any approved manner. The tongue or pole 28ª is provided with an equalizer or a doubletree, as occasion may demand.

The frame B is pivotally connected with the axle A usually in the manner illustrated in Figs. 1 and 2, in which it will be observed that castings or forgings 38 are secured to the rear ends of the side bars 25 of the frame B. These castings or forgings are provided with vertical openings extending through their rear portions from top to bottom, and likewise side openings 39, through which pins 40 are passed, and these pins are likewise passed through the pendent portions of brackets 40ª, which brackets 40ª are secured to the axle. Under this arrangement the frame B is not only pivotally attached to the axle, but is likewise capable of vertical movement.

The frame B is provided with a rear bar 37, which is simply a cross-bar; but this rear bar 37 is attached to a link 41, and the link 41 is connected with a lever 42, mounted on the axle A, the lever operating in connection with a rack 43, carried by the axle, as illustrated in Fig. 1. By means of the lever 42 the frame B may be raised or lowered.

A shaft 44 is mounted to turn at its ends in suitable bearings supported by the side portions of the frame B, and at the right-hand end of the shaft 44 a sleeve 45 is mounted to slide on the shaft, yet turn therewith. This sleeve is normally held at the right-hand extremity of the shaft 44 by a spring 46, and a shifting lever 48 is utilized to control the movement of the sleeve 45, the shifting lever being fulcrumed usually on the right-hand side bar 25 of the frame B, as illustrated in Fig. 6. The shifting lever 48 is connected by a link 49 with a lever 50, and this lever 50 is pivoted upon a bracket 51, forwardly projected from the axle A, the bracket having a rack formed thereon which is engaged by the usual thumb-piece with which the said lever is provided.

The sleeve 45 is provided at its outer end with an arm 47, and when the sleeve 45 is in its normal position or is held at the outer end of the shaft 44 by the spring 46 as the right-hand wheel revolves the cams or projections 13 on the rim 12, carried by the right-hand ground-wheel 10, will engage with the arm 47, and thus rock the shaft 44, and as soon as the arm 47 of the said sleeve is released from engagement with an offset or cam 13 springs 53, carried by arms 52, secured to the shaft, will return the shaft 44 to its normal position, the springs 53 being attached, preferably, to the seedboxes C, as shown in Figs. 1 and 2. The shaft 44 is adapted to operate the seed-dropping devices carried by the seedboxes C. The seed-dropping mechanism may be of the reciprocating character shown in Fig. 4 or it may be of the rotary type, as illustrated in Fig. 7, the seedboxes being adapted to accommodate either type.

Under the construction shown in Figs. 4 and 5 a seed-drop slide D is mounted to slide in the bottom of each seedbox. This seed-drop slide is provided with an opening 55, which is in the nature of a pocket and is adapted to receive seed, and as the drop-slides D are carried rearward the seed in the pockets 55 will be discharged in the chutes 31.

It is sometimes necessary to regulate the number of seeds in a pocket 55. Therefore the seed-drop slide at the rear of its pocket 55 is provided with a depression 56, in which a plate 57 is adapted to slide, having a flange at that end which enters the pocket 55, and the position of the regulating-slide 57 is controlled by a set-screw 58, passed through a suitable slot in the said regulating-slide, as shown in Fig. 4. These seed-drop slides D are pivotally connected with arms 59, and these arms are attached to the rock-shaft 44. Thus each time that the rock-shaft is actuated by a cam or projection 13, engaging with the arm 47, carried by the shaft, a seed-drop slide is drawn rearward and the seed is deposited in the chute belonging to the seedbox in which the slide has movement.

In Fig. 7 I have illustrated a rotary form of seed-drop slide which consists of a disk E, having a series of pockets 60 produced therein near its periphery, and a corresponding number of ratchet-teeth 60ª at its peripheral surface. This disk or wheel is provided with an arbor 60ᵇ, and this arbor, when a rotary drop E is employed, is mounted in a bearing 61 produced in the central portion of the bottom of the seedbox, and the rotary drop is actuated each time the rock-shaft is given motion in the manner described through the medium of a dog 62, which is mounted to slide in the seedbox, and its inner end is arranged for engagement with the ratchet-teeth of the rotary drop, while the outer or rear end of the dog is pivotally attached to an arm 63, carried by the said rock-shaft 44.

It is very necessary that the seed planted in the ground should be covered just after being deposited therein, and this is accomplished by pivoting a frame 64 to each seed-conducting chute 31, which frames extend rearward and are bifurcated at their front and at their rear end portions. The members of the rear end portions of these covering-frames 64 have disks 65, pivotally attached thereto at their inner faces, and these disks are preferably convexed at their outer surfaces and are concaved at their inner faces. The disks 65 of the covering-frames are held in engagement with the ground through the medium of springs 67, which are coiled around rods 66, attached to the frames 64, the upper ends of the springs having bearing, preferably, against a cross-bar of the frame B, as shown in Fig. 3. When it is desired to carry the covering devices out of engagement with the ground, this effect is accomplished through the medium of levers 68, which extend in direction of the driver's seat and are attached to the lift-rods 66, connected with the covering-frames 64, the said levers being shown as fulcrumed upon standards 69, attached to any convenient portion of the front frame B.

It will be observed that the mechanism of the planter is under perfect control of the driver and that the amount of seed to be dropped can be regulated and likewise the seed distributed while being dropped, so that it will not fall in a mass upon the ground.

Having thus described my invention, I claim as new and desire to secure by Letters Patent—

1. In a planter, the combination, with an axle, supporting-wheels carried thereby, one of said supporting-wheels being provided with check-markers and with offsets in alinement with said markers, of a frame supported from the axle, a rock-shaft carried by the frame, seedboxes likewise carried by the frame and provided with seed-dropping mechanism, which mechanism is connected with and is actuated from the rock-shaft, runner-like chutes carried by the boxes, a spring-controlled sleeve mounted on the shaft to slide thereon and turn therewith, one portion of the said sleeve being adapted to be engaged by the offsets on the said ground-wheel, and a shifting device for the sleeve, as described.

2. In a planter, the combination, with an axle, means for raising and lowering the same, and ground-wheels carried by the axle, one of which wheels is provided with check-markers and with projections in alinement with said check-markers, of a frame connected with the axle, a rock-shaft carried by the frame and spring-controlled in one direction, seed-boxes supported by the frame, the seed-dropping mechanism whereof is connected with the rock-shaft, a spring-controlled sleeve mounted to move longitudinally on the rock-shaft, having an extension arranged to be engaged by the projections on the ground-wheel carrying the marking-checks, and a shifting lever connected with the said sleeve.

3. In a planter, the combination with an axle, supporting-wheels for the same and a frame connected with the axle, of seedboxes, the seed-dropping mechanism whereof is controlled by the movements of one of the ground-wheels, delivery-chutes leading from the seedboxes, runners attached to the frame and extended rearward, the said runners having connection with the delivery-chutes and having outlets for the seed, and covering-disks located at the rear of the delivery-chutes.

4. In a planter, the combination, with an axle, supporting-wheels for the same, and a frame connected with the axle, of seedboxes the seed-dropping mechanism whereof is controlled by the movement of one of the ground-wheels, delivery-chutes for the seed, and divided into compartments at the outlet end and connected with the seedboxes, covering-disks located at the rear of the delivery-chutes, tension devices acting normally to force the covering devices in a downward direction, lift-levers for said covering devices, and a lifting mechanism for the axle of the machine, for the purpose specified.

5. In a planter, a seedbox, a delivery-chute for the seedbox, and a runner connected with the delivery-chute, the delivery portion of the runner being divided into compartments, whereby the seeds conveyed to the runner are separated before reaching the ground, as described.

In testimony whereof I have signed my name to this specification in the presence of two subscribing witnesses.

STEPHEN GREEN SPARROW.

Witnesses:
C. R. JOHNSON,
C. B. JONES.